(12) United States Patent
Oh-Yang

(10) Patent No.: US 6,692,298 B2
(45) Date of Patent: Feb. 17, 2004

(54) DUAL-PURPOSE CONNECTOR ASSEMBLY

(75) Inventor: Eric Oh-Yang, Hsinchu (TW)

(73) Assignee: Abocom Systems, Inc., Hsinchu (TW)

(*) Notice: Subject to any disclaimer, the term of this patent is extended or adjusted under 35 U.S.C. 154(b) by 0 days.

(21) Appl. No.: 10/157,831

(22) Filed: May 31, 2002

(65) Prior Publication Data

US 2003/0003798 A1 Jan. 2, 2003

(30) Foreign Application Priority Data

Jun. 29, 2001 (TW) ........................................ 90210994 U

(51) Int. Cl.$^7$ ............................................... H01R 13/60
(52) U.S. Cl. .................... 439/542; 439/929; 439/638
(58) Field of Search ................................. 439/533, 534, 439/542, 502, 523, 729, 638

(56) References Cited

U.S. PATENT DOCUMENTS

| | | | | |
|---|---|---|---|---|
| 2,149,549 A | * | 3/1939 | Reis | 439/534 |
| 2,740,039 A | * | 3/1956 | Phillips | 439/534 |
| 5,592,749 A | * | 1/1997 | Trimmer | 439/210 |
| 5,659,887 A | * | 8/1997 | Ooe | 455/575 |
| 5,839,919 A | * | 11/1998 | Chen | 439/529 |
| 6,250,967 B1 | * | 6/2001 | Chu | 439/534 |
| 6,290,534 B1 | * | 9/2001 | Sadler | 439/534 |
| 6,379,182 B1 | * | 4/2002 | Byrne | 439/574 |
| 6,521,836 B1 | * | 2/2003 | Simonazzi | 439/502 |

* cited by examiner

*Primary Examiner*—P. Austin Bradley
*Assistant Examiner*—Briggitte R. Hammond
(74) *Attorney, Agent, or Firm*—Nixon & Vanderhye PC.

(57) ABSTRACT

A dual-purpose connector assembly includes a stand, a first electrical connector, an electrical cable and a second electrical connector. The stand has a base adapted to be placed on a table surface, and a prop formed with a first cable passage that extends along a vertical axis. The base has a surrounding wall, and is formed with a second cable passage that extends from the first cable passage to the surrounding wall. The first electrical connector is mounted on the prop and is adapted to connect electrically with the peripheral device. The electrical cable has a first end connected to the first electrical connector, and a second end opposite to the first end, and extends through the first and second cable passages. The second electrical connector is connected to the electrical cable and is adapted to connect electrically with an electronic device.

3 Claims, 2 Drawing Sheets

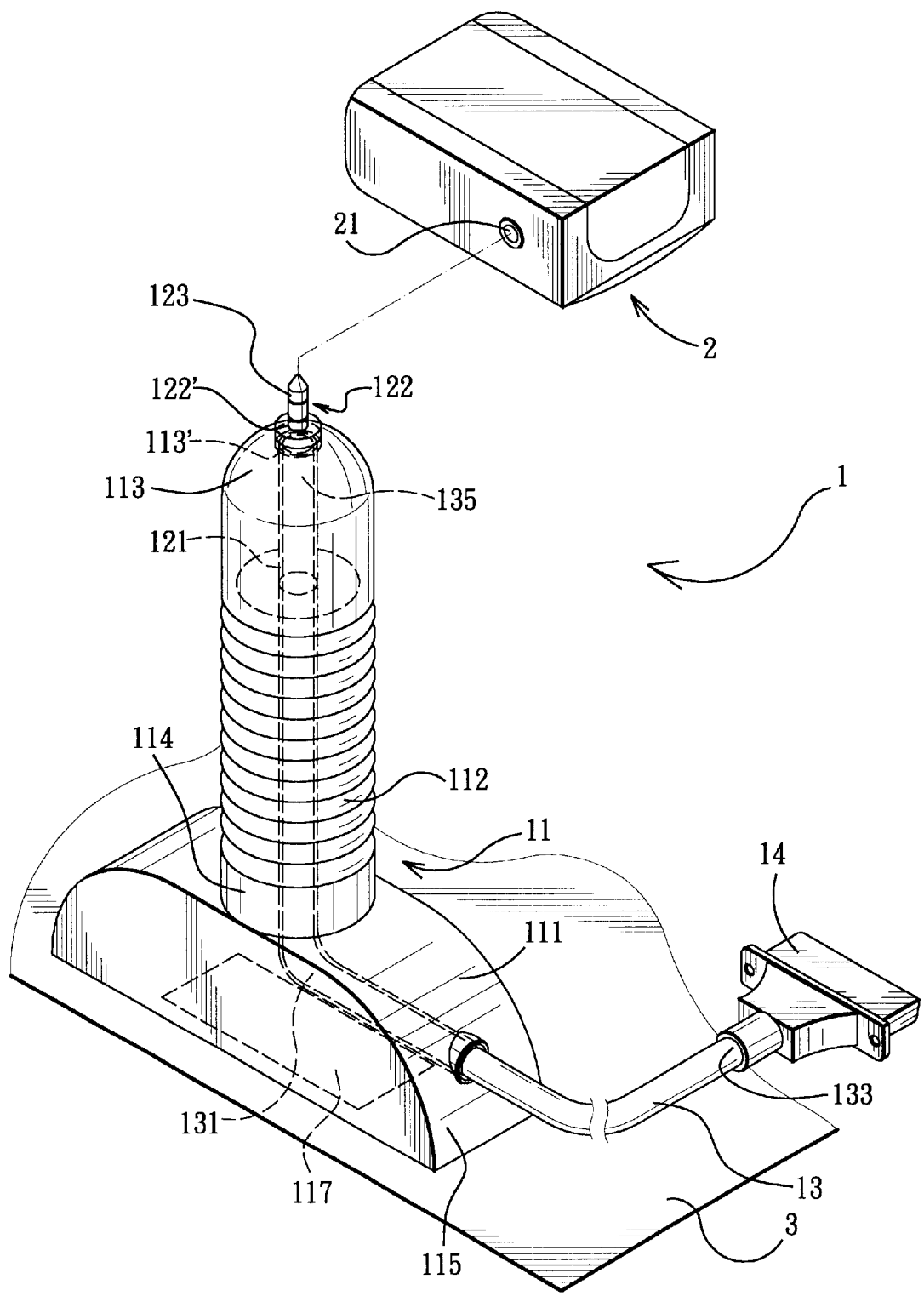
F I G. 1

DUAL-PURPOSE CONNECTOR ASSEMBLY

CROSS-REFERENCE TO RELATED APPLICATION

This application claims priority of Taiwanese application no. 090210994, filed on Jun. 29, 2001.

BACKGROUND OF THE INVENTION

1. Field of the Invention

This invention relates to a dual-purpose connector assembly, more particularly to a dual-purpose connector assembly for connecting a peripheral device to an electronic device.

2. Description of the Related Art

Conventionally, an electrical cable is used to connect a digital camera to a computer such that an image captured by the digital camera can be transmitted to the computer. However, storage of the conventional electrical cable can be troublesome. Moreover, the conventional electrical cable can only be used for signal transmission. When taking a picture, additional means, such as a tripod or stand, is needed for supporting the digital camera.

SUMMARY OF THE INVENTION

Therefore, the object of the present invention is to provide a dual-purpose connector assembly, which can be used to connect a peripheral device to an electronic device and to support the peripheral device.

According to this invention, a dual-purpose connector assembly includes a stand, a first electrical connector an electrical cable and a second electrical connector.

The stand includes a base adapted to be placed on a table surface, and a prop having a lower end connected to the base and an upper end opposite to the lower end along a vertical axis. The prop is formed with a first cable passage that extends from the upper end to the lower end. The base has a surrounding wall, and is formed with a second cable passage that extends from the first cable passage to the surrounding wall.

The first electrical connector is mounted on the upper end of the prop, and is adapted to connect electrically with the peripheral device so as to mount the peripheral device on the stand.

The electrical cable has a first end connected to the first electrical connector, and a second end opposite to the first end. The electrical cable extends through the first and second cable passages such that the second end of the electrical cable is disposed outwardly of the stand.

The second electrical connector is connected to the second end of the electrical cable, and is adapted to connect electrically with the electronic device.

BRIEF DESCRIPTION OF THE DRAWINGS

Other features and advantages of the present invention will become apparent in the following detailed description of the preferred embodiment of the invention, with reference to the accompanying drawings, in which:

FIG. 1 is a perspective view of the preferred embodiment of a dual-purpose connector assembly according to the present invention;

DETAILED DESCRIPTION OF THE PREFERRED EMBODIMENT

Figure 2:
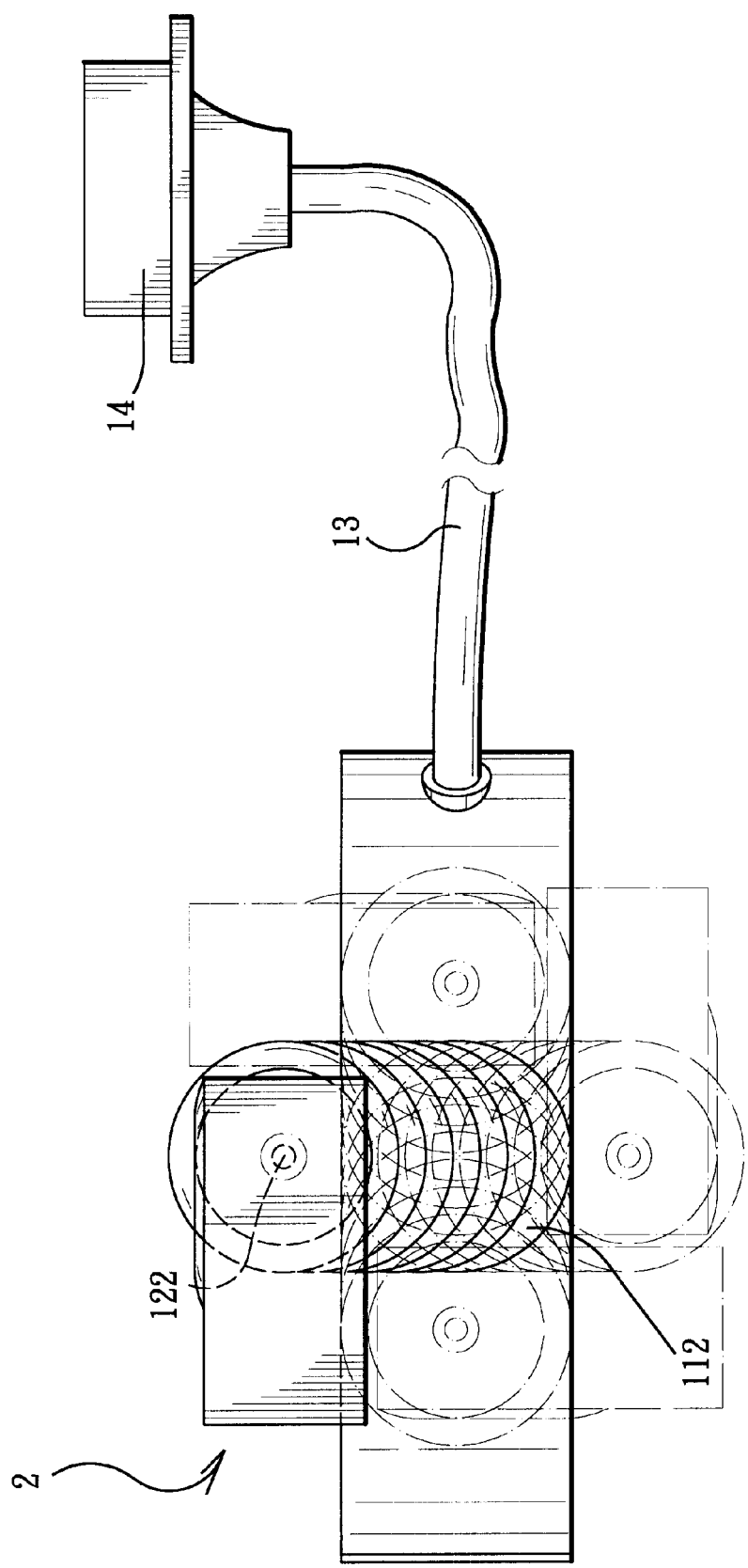
FIG. 2 is a schematic top view showing how the preferred embodiment can support a digital camera in different positions.

Referring to FIG. 1, the preferred embodiment of the dual-purpose connector assembly 1 according to the present invention is shown to comprise a stand 11, a first electrical connector 122, an electrical cable 13 and a second electrical connector 14.

The stand 11 includes a base 111 adapted to be placed on a table surface 3, and a prop 112 having a lower end 114 connected to the base 111 and an upper end 113 opposite to the lower end 114 along a vertical axis. The base 111 can be secured on the table surface 3 with the use of a hook-and-loop fastener or by means of an adhesive tape 117. The prop 112 is formed with a first cable passage 121 that extends from the upper end 113 to the lower end 114. The base 111 has a surrounding wall 115, and is formed with a second cable passage 131 that extends from the first cable passage 121 to the surrounding wall 115.

The first electrical connector 122 is mounted on the upper end 113 of the prop 112, and is adapted to connect electrically with an output port 21 of a peripheral device 2 so as to mount the peripheral device 2 on the stand 11.

The electrical cable 13 has a first end 135 connected to the first electrical connector 122, and a second end 133 opposite to the first end 135. The electrical cable 13 extends through the first and second cable passages 121, 131 such that the second end 133 of the electrical cable 13 is disposed outwardly of the stand 11.

The second electrical connector 14 is connected to the second end 133 of the electrical cable 13, and is adapted to connect electrically with an electronic device (not shown), such as a computer.

Preferably, the upper end 113 of the prop 112 is formed with a connector mounting space 113' that extends along the vertical axis and that is communicated with the first cable passage 121. The first electrical connector 122 has a mounting portion 122' mounted fixedly in the connector mounting space 113', and a coupling portion 123 that extends from the mounting portion 122', that is disposed outwardly of the stand 11, and that is adapted to be connected to the peripheral device 2. As the connector assembly of the present invention can be neatly disposed on the table surface 3, storage of the same is not required.

As illustrated in FIG. 2, the prop 112 is flexible and is capable of being retained at a flexed state relative to the vertical axis in a known manner, such that the peripheral device 2 can be retained at a suitable position.

It has thus been shown that the connector assembly of this invention not only permits connection of the peripheral device 2 to the electronic device, but can also support the peripheral device 2 at a suitable position relative to the table surface 3. The object of this invention is thus met.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A dual-purpose connector assembly for connecting a peripheral device to an electronic device, said connector assembly comprising:

a stand including a base adapted to be placed on a table surface, and a prop having a lower end connected to said base and an upper end opposite to said lower end along a vertical axis, said prop being formed with a first cable passage that extends from said upper end to said lower end, said upper end of said prop being formed with a connector mounting space that extends along the vertical axis and that is communicated with said first cable passage, said base having a surrounding wall and being formed with a second cable passage that extends from said first cable passage to said surrounding wall;

a first electrical connector mounted on said upper end of said prop and adapted to connect electrically with the peripheral device so as to mount the peripheral device on said stand, said first electrical connector having a mounting portion mounted fixedly in said connector mounting space, and a coupling portion that extends from said mounting portion, that is disposed outwardly of said stand, and that is adapted to be connected to the peripheral device;

an electrical cable having a first end connected to said first electrical connector, and a second end opposite to said first end, said electrical cable extending through said first and second cable passages such that said second end of said electrical cable is disposed outwardly of said stand; and a second electrical connector connected to said second end of said electrical cable and adapted to connect electrically with the peripheral device.

2. A dual-purpose connector assembly for connecting a peripheral device to an electronic device, said connector assembly comprising:

a stand including a base adapted to be placed on a table surface, and a prop having a lower end connected to said base and an upper end opposite to said lower end along a vertical axis, said prop being formed with a first cable passage that extends from said upper end to said lower end, said base having a surrounding wall and being formed with a second cable passage that extends from said first cable passage to said surrounding wall;

a first electrical connector mounted on said upper end of said prop and adapted to connect electrically with the peripheral device so as to mount the peripheral device on said stand;

an electrical cable having a first end connected to said first electrical connector, and a second end opposite to said first end, said electrical cable extending through said first and second cable passages such that said second end of said electrical cable is disposed outwardly of said stand; and a second electrical connector connected to said second end of said electrical cable and adapted to connect electrically with the electronic device.

3. A dual-purpose connector assembly for connecting a peripheral device to an electronic device, said connector assembly comprising:

a stand including a base adapted to be placed on a table surface, and a prop having a lower end connected to said base and an upper end opposite to said lower end along a vertical axis, said prop being formed with a first cable passage that extends from said upper end to said lower end, said prop being flexible and capable of being retained at a flexed state relative to the vertical axis, said base having a surrounding wall and being formed with a second cable passage that extends from said first cable passage to said surrounding wall;

a first electrical connector mounted on said upper end of said prop and adapted to connect electrically with the peripheral device so as to mount the peripheral device on said stand;

an electrical cable having a first end connected to said first electrical connector, and a second end opposite to said first end, said electrical cable extending through said first and second cable passages such that said second end of said electrical cable is disposed outwardly of said stand; and a second electrical connector connected to said second end of said electrical cable and adapted to connect electrically with the peripheral device.

* * * * *